United States Patent
Yu et al.

(10) Patent No.: US 10,133,026 B2
(45) Date of Patent: Nov. 20, 2018

(54) CONTROL METHOD FOR CAMERA OF HANDHELD ELECTRONIC DEVICE

(71) Applicant: HTC Corporation, Taoyuan (TW)

(72) Inventors: Wen-Hsiang Yu, Taoyuan (TW); Yu-Feng Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 20 days.

(21) Appl. No.: 15/161,282

(22) Filed: May 22, 2016

(65) Prior Publication Data

US 2017/0336598 A1 Nov. 23, 2017

(51) Int. Cl.
*H04N 5/232* (2006.01)
*G02B 7/40* (2006.01)
*G02B 7/08* (2006.01)

(52) U.S. Cl.
CPC ............. *G02B 7/40* (2013.01); *G02B 7/08* (2013.01); *H04N 5/23245* (2013.01)

(58) Field of Classification Search
CPC ......... G02B 7/40; G02B 7/08; H04N 5/23245
See application file for complete search history.

(56) References Cited

U.S. PATENT DOCUMENTS

| | | | | |
|---|---|---|---|---|
| 2011/0312349 A1* | 12/2011 | Forutanpour | ......... | G06F 1/1626 455/466 |
| 2014/0099994 A1* | 4/2014 | Bishop | ................. | H04N 5/2252 455/556.1 |
| 2014/0184846 A1* | 7/2014 | Yoon | ....................... | H04N 5/335 348/222.1 |
| 2014/0270689 A1* | 9/2014 | Chau | ................... | H04N 5/23245 386/227 |
| 2015/0116544 A1* | 4/2015 | Xu | ...................... | H04N 5/23245 348/234 |
| 2015/0177865 A1* | 6/2015 | Rodzevski | .............. | G06F 3/042 345/175 |

FOREIGN PATENT DOCUMENTS

| | | |
|---|---|---|
| CN | 1580933 A | 2/2005 |
| CN | 104730804 A | 6/2015 |
| TW | M486783 | 9/2014 |
| TW | 201547204 A | 12/2015 |

OTHER PUBLICATIONS

Corresponding Taiwanese office action dated Jan. 5, 2017.

\* cited by examiner

*Primary Examiner* — Shahbaz Nazrul
(74) *Attorney, Agent, or Firm* — CKC & Partners Co., Ltd.

(57) ABSTRACT

A handheld electronic device includes a first camera unit, a laser focusing module and a control module. The laser focusing module is configured for radiating a laser signal and receiving a feedback signal induced by a reflection of the laser signal when the first camera unit is activated. The control module is coupled with the camera unit and the laser focusing module. The control module is configured for monitoring a strength level of the feedback signal or a response time between the laser signal and the feedback signal, and selectively generating a command to trigger the first camera unit according to the strength level or the response time.

12 Claims, 8 Drawing Sheets

CONTROL METHOD FOR CAMERA OF HANDHELD ELECTRONIC DEVICE

FIELD OF INVENTION

The invention relates to a handheld electronic device. More particularly, the invention relates to a control method for a camera of the handheld electronic device.

BACKGROUND

In order to increase mobility of electronic devices, designers are challenged to figure out how to reduce sizes and weights of the electronic devices. On a handheld electronic device, the size is a critical issue for the designer. The handheld electronic devices (e.g., smart phones, digital cameras, sports cameras, tablets, or similar handheld devices) have less space for disposing buttons for different functions.

The handheld electronic devices may provide several functions to their users, such as taking photographs, answering phone calls, replying messages, browsing websites, etc. One popular function of the handheld electronic devices is taking photos including photographs of selfie photos, portraits, families, landscapes and other subjects. While taking photographs, it is important to remain the handheld electronic devices steady. Otherwise, the results of the images will be blurred or out of focus.

SUMMARY

An embodiment of this disclosure is to provide a handheld electronic device, which includes a first camera unit, a laser focusing module and a control module. The laser focusing module is configured for radiating a laser signal and receiving a feedback signal induced by a reflection of the laser signal when the first camera unit is activated. The control module is coupled with the camera unit and the laser focusing module. The control module is configured for monitoring a strength level of the feedback signal or a response time between the laser signal and the feedback signal, and selectively generating a command to trigger the first camera unit according to the strength level or the response time.

An aspect of the disclosure is to provide a control method suitable for a handheld electronic device. The handheld electronic device includes a first camera unit and a laser focusing module. The control method includes following steps. A laser signal is radiated by the laser focusing module when the first camera unit is activated. A feedback signal induced by a reflection of the laser signal is received. A strength level of the feedback signal or a response time between the laser signal and the feedback signal are monitored. A command is selectively generated to trigger the first camera unit according to the strength level or the response time.

Another aspect of the disclosure is to provide a non-transitory computer readable storage medium with a computer program to execute a control method. The control method includes following steps. A feedback signal induced by a reflection of a laser signal is received. A strength level of the feedback signal or a response time between the laser signal and the feedback signal is monitored. A command is selectively generated to trigger a camera unit according to the strength level or the response time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configuration is discussed.

Figure 1:
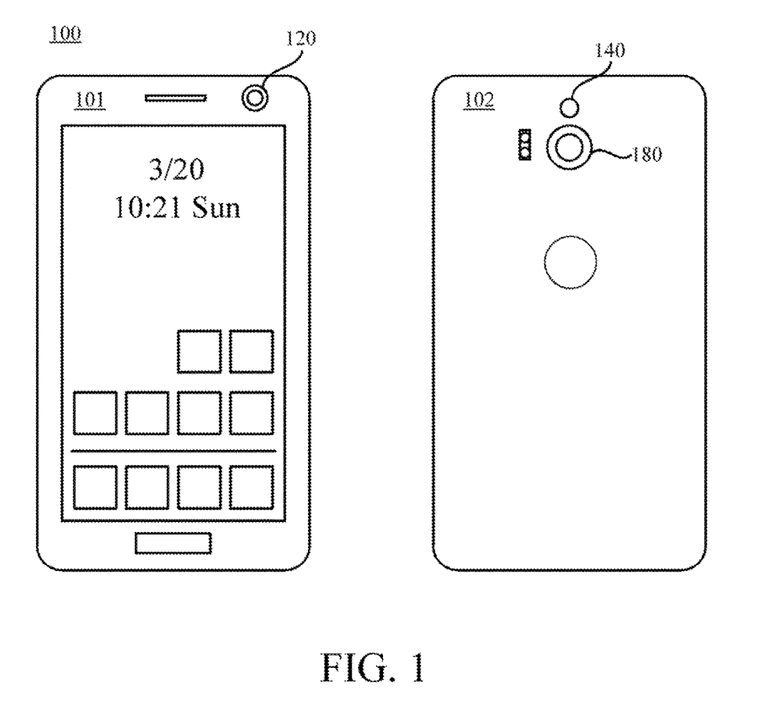
FIG. 1 is a schematic diagram illustrating two sides of a handheld electronic device according to some embodiments of the disclosure.
Figure 2:
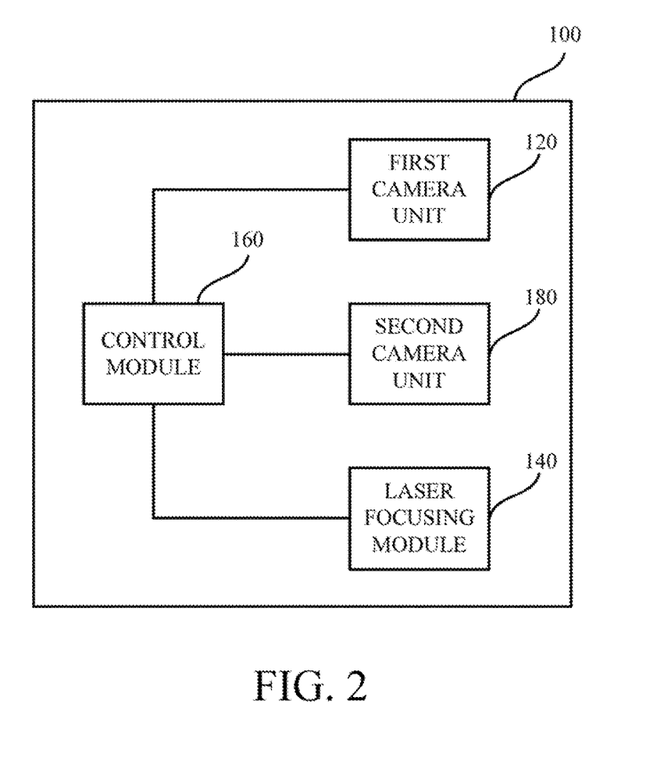
FIG. 2 is a functional block diagram illustrating the handheld electronic device in FIG. 1.

Reference is made to FIG. 1 and FIG. 2. FIG. 1 is a schematic diagram illustrating two sides of a handheld electronic device 100 according to some embodiments of the disclosure. FIG. 2 is a functional block diagram illustrating the handheld electronic device 100 in FIG. 1. As shown in FIG. 1, the handheld electronic device 100 include a first camera unit 120, a laser focusing module 140 and a second camera unit 180.

In the embodiments shown in FIG. 1, the first camera unit 120 is disposed on a first surface 101 of the handheld electronic device 100. As illustrated in FIG. 1, some other components (e.g., a displayer, a speaker and/or a home button) of the handheld electronic device 100 are able to be disposed on the first surface 101. In the embodiments shown in FIG. 1, the laser focusing module 140 and the second camera unit 180 are disposed on a second surface 102 of the handheld electronic device 100. The second surface 102 is opposite to the first surface 101. As illustrated in FIG. 1, some other components (e.g., a LED flash module and/or a fingerprint reader) of the handheld electronic device 100 are able to be disposed on the second surface 101.

The laser focusing module 140 in some embodiments includes a laser emitter circuit for generating the laser signal and an optical sensor circuit for sensing/receiving the feedback signal induced by the reflection of the laser signal.

As shown in FIG. 2, the handheld electronic device 100 further includes control module 160. The control module 160 is coupled to the first camera unit 120, the laser focusing module 140 and the second camera unit 180. In some embodiments, the control module 160 can be an Image Signal Processor (ISP), a processing circuit, a control integrated circuit (IC), a central processing unit (CPU) or any equivalent circuits of the handheld electronic device 100.

In embodiments shown in FIG. 1, the handheld electronic device 100 is a smart phone. The first camera unit 120 is regarded as a front camera of the smart phone disposed on the front side. The first camera unit 120 is usually utilized to capture a selfie image of the user of the handheld electronic device 100. The second camera unit 180 is regarded as a main camera of the smart phone disposed on the back side. The second camera unit 180 is usually utilized to capture high-quality images for general purposes.

The handheld electronic device 100 in the disclosure is not limited to a smart phone for demonstrations. The handheld electronic device 100 can be a personal digital assistant (PDA), a smart camera, a tablet camera or any equivalent device equipped with the first camera unit 120 and the laser focusing module 140.

The laser focusing module 140 is disposed on the same surface with the second camera unit 180. The laser focusing module 140 is configured to radiate a laser signal and sense a feedback signal induced by the laser signal. Based on the feedback signal, the laser focusing module 140 is able to measure a distance between the laser focusing module 140 and an object in front of the laser focusing module 140. When the second camera unit 180 is activated, the laser focusing module 140 is configured for detecting a focal distance utilized by the second camera unit 180.

In some traditional cases, when the user activates the first camera unit 120 for shooting a selfie image and the second camera unit 180 is idle or turned off, the laser focusing module 140 will be idle or turned off, because the laser focusing module 140 is not required to detect the focal distance for the second camera unit 180. However, in some embodiments of the disclosure, when the first camera unit 120 is activated, the laser focusing module 140 will be activated simultaneously to detect some gestures/movements from the users. Based on the gestures/movements a command is selectively generated to trigger the first camera unit 120 to capture an image and/or adjust a configuration of the first camera unit 120 (e.g., switching into a video-recording mode, adjusting white balance setting, zooming in/out, etc). Details about how to generate the command are disclosed in following paragraphs.

Figure 3:
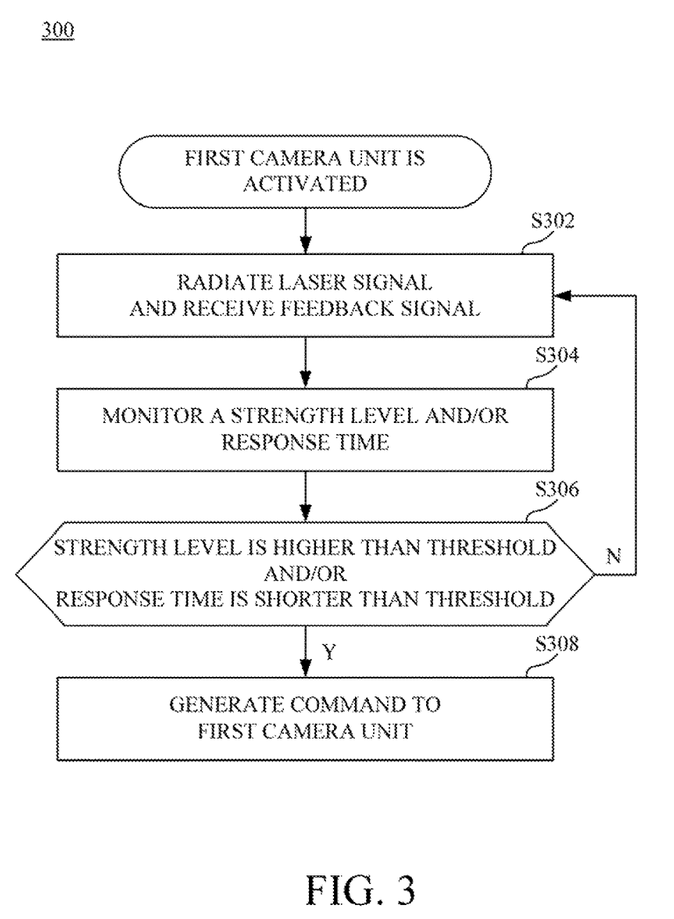
FIG. 3 is a flow diagram illustrating a control method according to some embodiments of the disclosure.

Reference is also made to FIG. 3, which is a flow diagram illustrating a control method 300 according to some embodiments of the disclosure. The method 300 is suitable to be applied on the handheld electronic device 100 shown in FIG. 1 and FIG. 2. When the first camera unit 120 is activated (e.g., the user turns on a camera application program on the handheld electronic device 100 and switches to view a preview screen of the front camera), operation S302 is performed to activate the laser focusing module 140 for radiating a laser signal and receiving a feedback signal induced by a reflection of the laser signal.

In some embodiments, operation S304 is performed by the control module 160 to monitor a strength level of the feedback signal and/or a response time between the laser signal and the feedback signal.

Figure 4A:
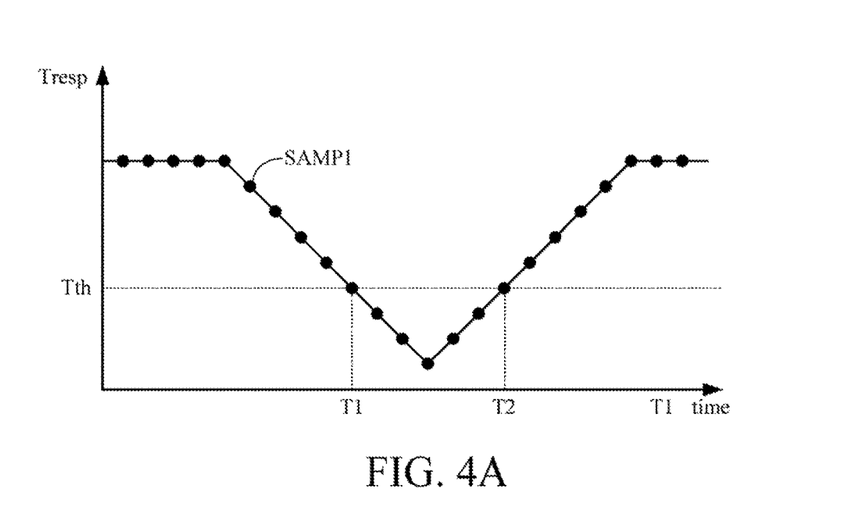
FIG. 4A is a schematic diagram illustrating sampled results of the response time between the laser signal and the feedback signal over time according to some embodiments.

Reference is also made to FIG. 4A, which is a schematic diagram illustrating sampled results of the response time Tresp between the laser signal and the feedback signal over time according to some embodiments. The response time Tresp indicates a time gap since the laser signal is sent until the corresponding feedback signal is received. The response time Tresp can be sampled periodically over time. Each of sampled nodes SAMP1 indicates one sampled result of the response time Tresp measured by the laser focusing module 140. In practical applications, the laser focusing module 140 is able to operate at a sample rate about 1 Hz (one sampled node SAMP1 is detected per second) to about 500 Hz (five hundreds of sampled nodes SAMP1 are detected per second). When an object in front of the laser focusing module 140 is located far from the laser focusing module 140, the response time Tresp will be longer. When an object in front of the laser focusing module 140 is moving closer to the laser focusing module 140 the response time Tresp will be shorter.

As shown in FIG. 4A, if the user move his finger to click on the laser focusing module 140 (or to block the Laser focusing module 140), the response time Tresp will be reduced when the finger is moved closer, and then the response time Tresp will be resumed to original level when the finger is moved away.

Figure 4B:
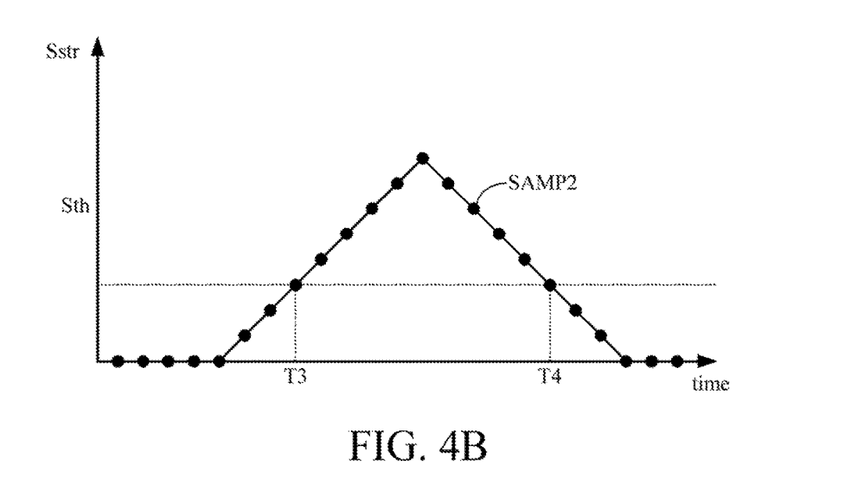
FIG. 4B is a schematic diagram illustrating sampled results of the strength level of the feedback signal over time according to some embodiments.

Reference is also made to FIG. 4B, which is a schematic diagram illustrating sampled results of the strength level Sstr of the feedback signal over time according to some embodiments. The strength level Sstr indicates a brightness level or an intensity level of the feedback signal received by the laser focusing module 140. The strength level Sstr can be sampled periodically over time. Each of sampled nodes SAMP2 indicates one sampled result of the strength level Sstr measured by the laser focusing module 140. In practical applications, the laser focusing module 140 is able to sample at about 1 Hz to about 500 Hz. When an object in front of the laser focusing module 140 is located far from the laser focusing module 140, the strength level Sstr will be lower. When an object in front of the laser focusing module 140 is moving closer to the laser focusing module 140, the strength level Sstr will be higher.

As shown in FIG. 4B, if the user move his finger to click on the laser focusing module 140 (or to block the laser focusing module 140), the strength level Sstr will be higher when the finger is moved closer, and then the strength level Sstr will be resumed to original level when the finger is moved away.

Operation S306 is performed to determine whether the response time Tresp is shorter than a threshold response time Tth (as shown in FIG. 4A) and/or the strength level Sstr is higher than a threshold strength level Sth (as shown in FIG. 4B).

In some embodiment, when the response time Tresp is shorter than a threshold response time Tth as shown in FIG. 4A or when the strength level Sstr is higher than a threshold strength level Sth as shown in FIG. 4B, operation S308 is performed to generate a command to the first camera unit 120. The command can be generated from the time point T1 to the time point T2 in FIG. 4A or be generated from the time point T3 to the time point T4 in FIG. 4B. In some embodiments, the command is sent to the first camera unit 120 and triggers the first camera unit 120 to capture an image (e.g., a selfie photo). In some other embodiments, the command is sent to the first camera unit 120 and triggers the first camera unit 120 to adjust some configuration, such as switching into a video-recording mode, adjusting white balance setting, zooming in/out, etc.

In some other embodiments, the operation S308 is performed to generate a command to the first camera unit 120 only when the response time Tresp is shorter than a threshold response time Tth as shown in FIG. 4A and also the strength level Sstr is higher than a threshold strength level Sth as shown in FIG. 4B. In this case, the command can be generated in an overlapping portion of time points T1 to T2 and time points T3 to T4.

Based on aforesaid embodiments, when the user tends to capture a selfie image by the first camera unit 120, the user can move his finger toward and block the laser focusing module 140 on the back side of the handheld electronic device 100. The moving finger will not block a visual scope of the first camera unit 120 on the front side of the handheld electronic device 100. In addition, the finger is not required to press hard on the handheld electronic device 100, such that aforesaid movement will induce less vibration to the handheld electronic device 100. Therefore, the user is not required to press a virtual key on a touch screen or press a physic button (e.g., a volume-up button, a volume-down button, a power button, etc) and takes risks to block the visual scope of the first camera unit 120 or induce undesired vibration.

Figure 5:
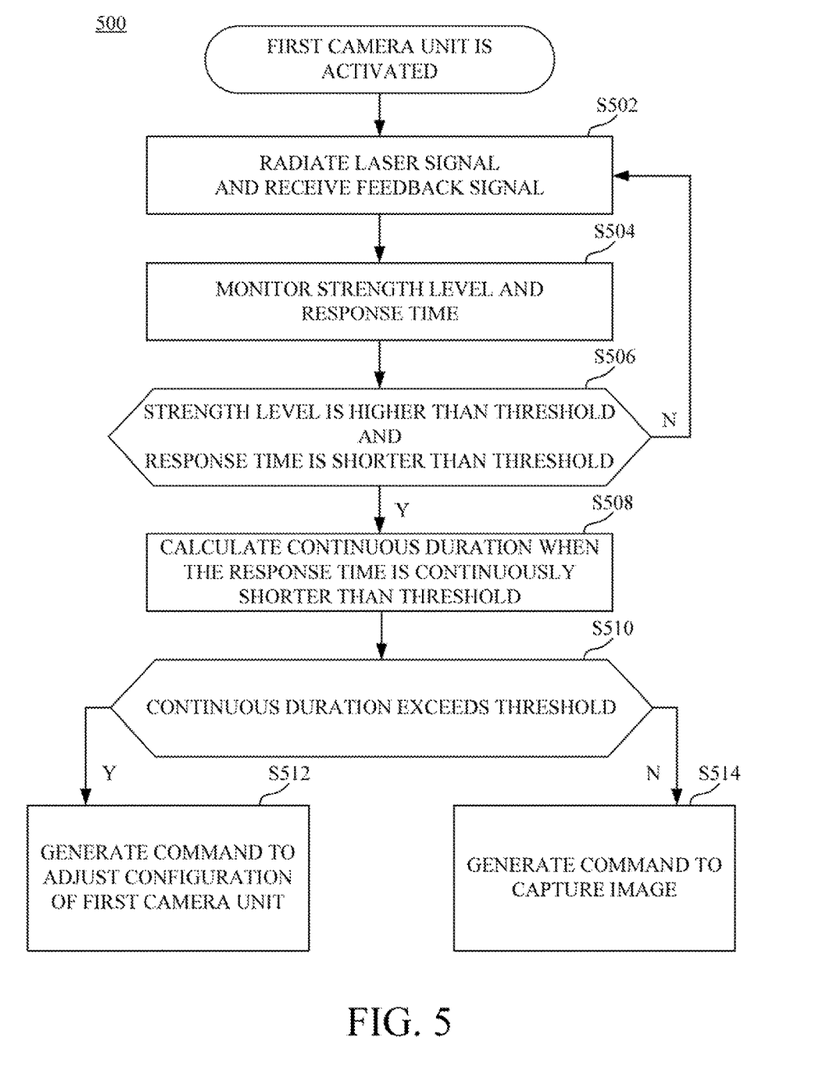
FIG. 5 is a flow diagram illustrating a control method according to some embodiments of the disclosure.

Reference is further made to FIG. 5, which is a flow diagram illustrating a control method 500 according to some embodiments of the disclosure. The control method 500 is suitable to be utilized on the handheld electronic device shown in FIG. 1 and FIG. 2. Compared with the control method 300 shown in FIG. 3, the control method 500 further includes operations to distinguish different gestures/movements performed the user and generate different commands corresponding individual gestures/movments.

As shown in FIG. 5, when the first camera unit 120 is activated (e.g., the user turns on a camera application program on the handheld electronic device 100 and switches to view a preview screen of the front camera), operation S502 is performed to activate the laser focusing module 140 for radiating a laser signal and receiving a feedback signal induced by a reflection of the laser signal.

Figure 6A:
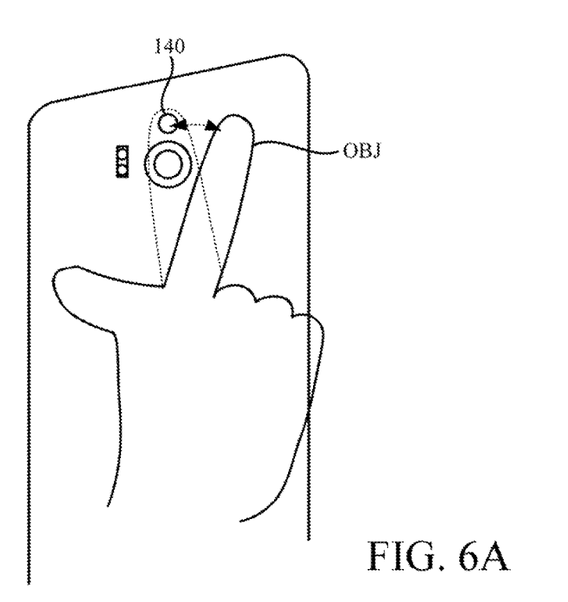
FIG. 6A and FIG. 6B illustrating examples of different gestures/movements of a finger of the use.
Figure 6B:
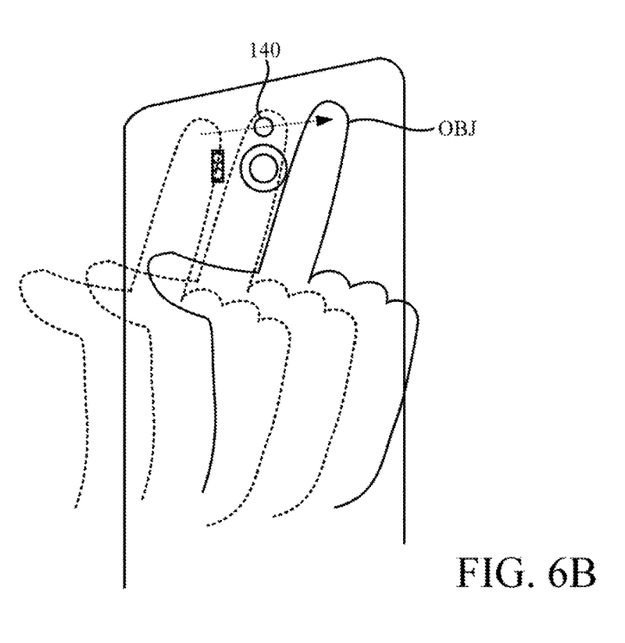

In some embodiments, operation S504 is performed by the control module 160 to monitor a strength level of the feedback signal and a response time between the laser signal and the feedback signal. Based on the strength level and the response time, the method 500 is able to distinguish different gestures/movements of the user toward the laser focusing module 140. Reference is also made to FIG. 6A and FIG. 6B. FIG. 6A and FIG. 6B illustrating examples of different gestures/movements of a finger OBJ of the user. In FIG. 6A, the user perform a click movement with his finger, which moves vertically toward the laser focusing module 140 and then moves vertically away from the laser focusing module 140. In FIG. 6B, the user perform a slide movement with his finger, which moves the laser focusing module 140 from one side to another side. The finger is gradually changed from partially blocking the laser focusing module 140, fully blocking the laser focusing module 140 and then partially blocking the laser focusing module 140. It is noticed that it is not limited to block the laser focusing module 140 with the finger of the user. For example, the user can use his palm to perform the gesture, or alternatively the user may manipulate a pen, a stick or any equivalent object to block the laser focusing module 140.

Figure 7A:
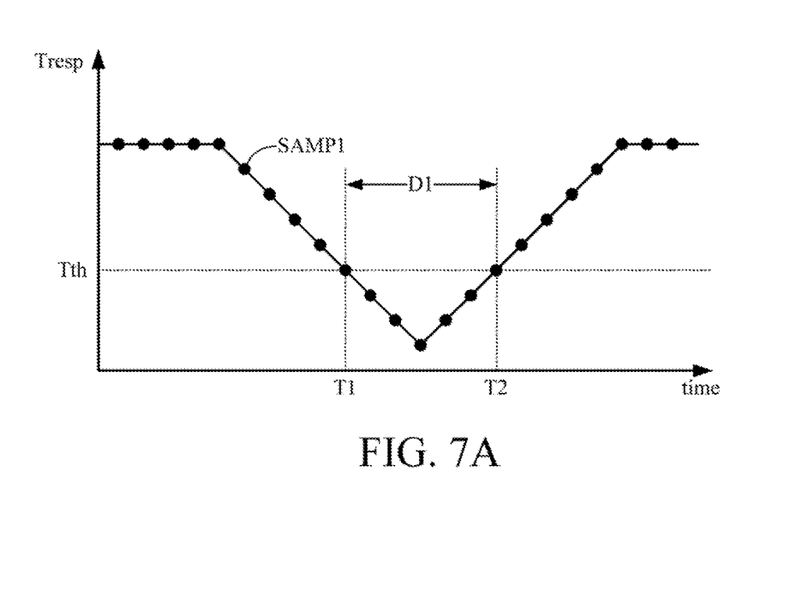
FIG. 7A and FIG. 7B illustrate examples of sampled results of the response time and the strength level corresponding to the gestures/movements of the finger shown in FIG. 6A according to some embodiments.
Figure 7B:
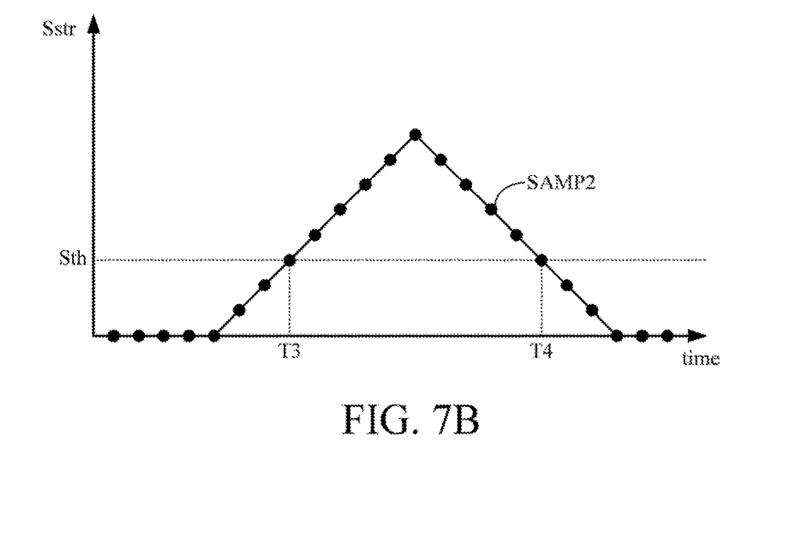
Figure 8A:
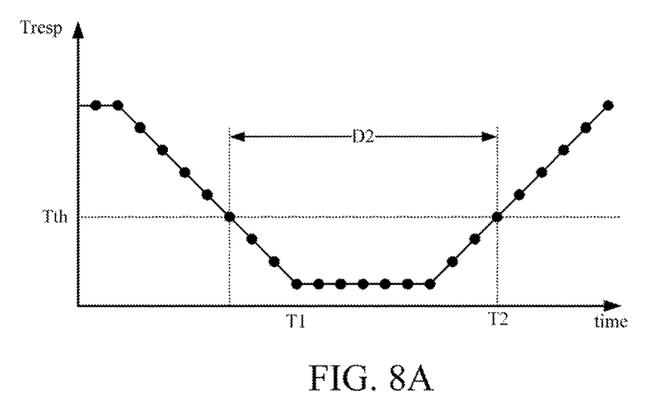
FIG. 8A and FIG. 8B illustrate typical examples of other sampled results of the response time and the strength level corresponding to the gestures/movements of the finger shown in FIG. 6B according to some embodiments.
Figure 8B:
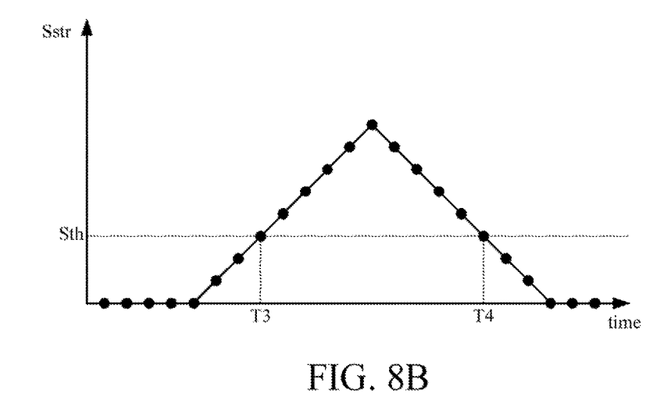

Due to the different gestures/movements of the finger shown in FIG. 6A and FIG. 6B, the sampled results of the response time and the strength level will be different accordingly. FIG. 7A and FIG. 7B illustrate examples of sampled results of the response time Tresp and the strength level Sstr corresponding to the gestures/movements of the finger shown in FIG. 6A according to some embodiments. FIG. 8A and FIG. 8B illustrate typical examples of other sampled results of the response time Tresp and the strength level Sstr corresponding to the gestures/movements of the finger shown in FIG. 6B according to some embodiments.

As shown in FIG. 6A, when the finger OBJ moves toward the laser focusing module 140, the response time Tresp is reduced and the strength level Sstr is increased correspondingly. When the finger OBJ moves away from the laser focusing module 140, the response time Tresp is increased and the strength level Sstr is decreased correspondingly as discussed in aforesaid paragraphs related to FIG. 4A and FIG. 4B. As shown in FIG. 7A, the response time Tresp will be continuously below the threshold response time Tth for a continuous duration D1, between time points T1 to T2 in FIG. 7A, when the user perform the clicking gesture/movement shown in FIG. 6A.

As shown in FIG. 6B, when the finger OBJ moves to partially block the laser focusing module 140 from the left side, the response time Tresp is reduced quickly and the strength level Sstr is increased slowly. The strength level Sstr of the feedback signal will be increased to the top level when the finger OBJ fully blocks the focusing module 140 in the middle. When the finger OBJ moves to the right side of the laser focusing module 140 from the middle, the response time Tresp is increased slowly and the strength level Sstr is decreased quickly correspondingly. As shown in FIG. 8A, the response time Tresp will be continuously below the threshold response time Tth for a continuous duration D2, between time points T1 to T2 in FIG. 8A, when the user perform the sliding gesture/movement shown in FIG. 6B.

As shown in FIG. 5, operation S506 is performed to determine whether the response time Tresp is shorter than a threshold response time Tth (as shown in FIG. 7A/8A) and the strength level Sstr is higher than a threshold strength level Sth (as shown in FIG. 7B/8B). When the user performs gestures/movements toward the laser focusing module 140, the response time Tresp will be shorter than a threshold response time Tth and the strength level Sstr will be higher than the threshold strength level Sth.

Operation S508 is performed to calculated a continuous duration (such as the continuous duration D1 in FIG. 7A or the continuous duration D2 in FIG. 8A) that that sampled results of the response time Tresp are continuously shorter than the threshold response time Tth. It is assumed that the sample rate of the focusing module 140 is 100 Hz, and a threshold continuous duration is configured at 0.1 second. In example, the continuous duration D1 shown in FIG. 7A is 0.06 second below the threshold continuous duration, and the continuous duration D2 shown in FIG. 8A is 0.12 second exceeding the threshold continuous duration. Operation S510 performed to compare the continuous duration D1/D2 with the threshold continuous duration.

When the user performs gestures/movements shown in FIG. 6A, the continuous duration D1 will be shorter than the threshold continuous duration, such that operation S514 will be performed to generate a command by the control module 160 for triggering the first camera unit 120 to capture an image e.g., a selfie photo). On the other hand, when the user performs gestures/movements shown in FIG. 6B, the continuous duration D2 will exceed the threshold continuous duration, such that operation S512 will be performed to generate a command by the control module 160 for adjusting a configuration of the first camera unit 120 (e.g., switching into a video-recording mode adjusting white balance setting, zooming in/out).

Based on aforesaid embodiments, when the user tends to capture a selfie image by the first camera unit 120 or perform some functions related to the first camera unit 120, the user can move his finger with a specific pattern/movement over the laser focusing module 140, which is located on the back side of the handheld electronic device 100. Therefore, the laser focusing module 140 can be utilized as a shutter key or a functional key to trigger the first camera unit 120. Based on the control method 300 and the control method 500 disclosed above, the laser focusing module 140 is able to provide the focal distance to the second camera unit 180 when the second camera unit 180 is activated, and alternatively serves as a shutter key or a functional key when the first camera unit 180 is activated.

Based on aforesaid embodiments, some other embodiments of the disclosure provide a non-transitory computer readable storage medium. The non-transitory computer readable storage medium stores a computer program performing aforesaid control method 300 shown in FIG. 3 or aforesaid control method 500 shown in FIG. 5.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A handheld electronic device, comprising:
   a first camera unit;
   a laser focusing module, configured for radiating a laser signal and receiving a feedback signal induced by a reflection of the laser signal when the first camera unit is activated; and
   a control module, coupled with the first camera unit and the laser focusing module, the control module being configured for monitoring a strength level of the feedback signal or a response time between the laser signal and the feedback signal, and selectively generating a command to trigger the first camera unit according to the strength level or the response time;
   wherein in response to that the response time is shorter than a threshold response time or the strength level is higher than a threshold strength level, the control module generates the command to trigger the first camera unit;
   wherein the strength level and the response time are sampled periodically over time, the control module further measures a continuous duration that sampled results of the response time are continuously shorter than the threshold response time; and
   wherein in response to that the continuous duration is shorter than a threshold duration and the strength level is higher than the threshold strength level, the control module triggers the first camera unit to capture an image.

2. The handheld electronic device of claim 1, wherein the first camera unit is disposed on a first surface of the handheld electronic device, the handheld electronic device further comprises a second camera unit, the second camera unit and the laser focusing module are disposed on a second surface of the handheld electronic device different from the first surface.

3. The handheld electronic device of claim 1, wherein when the second camera unit is activated, the laser focusing module is configured for detecting a focal distance utilized by the second camera unit.

4. The handheld electronic device of claim 1, wherein in response to that the continuous duration exceeds the threshold duration and the strength level is higher than the threshold strength level, the control module generates the command to adjust a configuration of the first camera unit.

5. A control method, suitable for a handheld electronic device comprising a first camera unit and a laser focusing module, the control method comprising:
   radiating a laser signal by the laser focusing module when the first camera unit is activated;
   receiving a feedback signal induced by a reflection of the laser signal;
   monitoring a strength level of the feedback signal or a response time between the laser signal and the feedback signal; and
   selectively generating a command to trigger the first camera unit according to the strength level or the response time;
   wherein in response to that the response time is shorter than a threshold response time and the strength level is higher than a threshold strength level, the command is generated to trigger the first camera unit.

6. The control method of claim 5, wherein the strength level and the response time are sampled periodically over time, the control module further measures a continuous duration that sampled results of the response time are continuously shorter than the threshold response time.

7. The control method of claim 6, wherein in response to that the continuous duration is shorter than a threshold duration and the strength level is higher than the threshold strength level, the command triggers the first camera unit to capture an image.

8. The control method of claim 6, wherein in response to that the continuous duration exceeds the threshold duration and the strength level is higher than the threshold strength level, the command triggers the first camera unit to adjust to a configuration of the first camera unit.

9. A non-transitory computer-readable recording medium storing a computer program performing a control method, the control method comprising:
   receiving a feedback signal induced by a reflection of a laser signal;
   monitoring a strength level of the feedback signal or a response time between the laser signal and the feedback signal; and selectively generating a command to trigger a camera unit according to the strength level or the response time;

wherein in response to that the response time is shorter than a threshold response time and the strength level is higher than a threshold strength level, the command is generated to trigger the camera unit.

10. The non-transitory computer-readable recording medium of claim 9, wherein the strength level and the response time are sampled periodically over time, the control module further measures a continuous duration that sampled results of the response time are continuously shorter than the threshold response time.

11. The non-transitory computer-readable recording medium of claim 10, wherein in response to that the continuous duration is shorter than a threshold duration and the strength level is higher than the threshold strength level, the command triggers the camera unit to capture an image.

12. The non-transitory computer-readable recording medium of claim 10, wherein in response to that the continuous duration exceeds the threshold duration and the strength level is higher than the threshold strength level, the command triggers the camera unit to adjust to a configuration of the camera unit.

\* \* \* \* \*